United States Patent
Nelson

(10) Patent No.: US 6,809,520 B1
(45) Date of Patent: Oct. 26, 2004

(54) COMPACT, AUTONOMOUS ROBOTIC DETECTION AND IDENTIFICATION SENSOR SYSTEM OF UNEXPLODED ORDNANCE SITE REMEDIATION

(75) Inventor: Carl V. Nelson, Derwood, MD (US)

(73) Assignee: The Johns Hopkins University, Baltimore, MD (US)

(*) Notice: Subject to any disclaimer, the term of this patent is extended or adjusted under 35 U.S.C. 154(b) by 50 days.

(21) Appl. No.: 10/332,095
(22) PCT Filed: Nov. 25, 2002
(86) PCT No.: PCT/US02/37736
§ 371 (c)(1),
(2), (4) Date: Jan. 3, 2003
(87) PCT Pub. No.: WO03/056353
PCT Pub. Date: Jul. 10, 2003

Related U.S. Application Data

(60) Provisional application No. 60/337,308, filed on Dec. 4, 2001.

(51) Int. Cl.[7] .......................... G01V 3/11; G01N 27/72
(52) U.S. Cl. .................. 324/329; 324/326; 324/239; 89/1.13
(58) Field of Search ............... 324/228, 242–243, 324/260, 262–263, 326, 329; 89/1.13

(56) References Cited

U.S. PATENT DOCUMENTS

| | | | |
|---|---|---|---|
| 5,307,272 A | 4/1994 | Butler et al. .................. 700/90 |
| 5,452,639 A | 9/1995 | Aulenbacher ............... 89/1.13 |
| 6,026,135 A * | 2/2000 | McFee et al. ................ 376/159 |
| 6,064,209 A * | 5/2000 | Banerjee ...................... 324/329 |
| 6,084,412 A | 7/2000 | Guo et al. .................... 324/336 |
| 6,104,193 A * | 8/2000 | Bell ............................. 324/329 |
| 6,319,079 B1 * | 11/2001 | Cooper ....................... 440/12.5 |
| 6,333,631 B1 | 12/2001 | Das et al. .................... 324/326 |
| 6,411,095 B1 | 6/2002 | Chin et al. ................... 324/326 |
| 6,476,610 B1 * | 11/2002 | Wiegert et al. ............. 324/345 |
| 6,559,645 B2 * | 5/2003 | Arndt et al. ................. 324/329 |
| 6,590,519 B2 | 7/2003 | Miceli et al. ................. 342/22 |
| 6,626,078 B2 | 9/2003 | Thornton ........................ 86/50 |
| 2002/0030492 A1 | 3/2002 | Guo et al. |

OTHER PUBLICATIONS

Low–Cost Back–pack Portable Robot System for Mine & UXO Detect. & Identi., Proc. of SPIE: Det. & Rem. Tech. for Mine & Minelike Targets VII, vol. 4742, pps. 574–582, 1–5, 4/02 by Nelson, et al.

(List continued on next page.)

Primary Examiner—Jay Patidar
Assistant Examiner—Darrell Kinder
(74) Attorney, Agent, or Firm—Albert J. Fasulo, II

(57) ABSTRACT

A device operative to detect metal objects. The device includes a transmitter circuit, an upper transmitter coil and a lower transmitter coil operatively connected to the transmitter circuit. A current fed through the upper transmitter coil and the lower transmitter coil generates a field that excites eddy currents in metal objects in the vicinity of the upper transmitter coil and the lower transmitter coil. An upper magnetic field detector and a lower magnetic field detector are operative to sense eddy currents generated in the metal objects. Processor elements operatively connected to the upper magnetic field detector and the lower magnetic field detector collect, store and analyze the eddy currents and thereby determine the likelihood that a metal object has been detected. A navigation system operatively connected to the processor elements controls movement of the device. Transporting elements operatively connected to the navigation system are operative to support the device and permit alteration of a position of the device.

28 Claims, 2 Drawing Sheets

OTHER PUBLICATIONS

Wide Bandwidth Time Domain Electro Magnetic Sensor for Metal Target Classification, IEEE Transactions on Geoscience & Remote Sensing, vol. 39, #6, 6/01, Nelson et al.

Wide Bandwidth, Time Decay Responses from Low–Metal Mines and Ground Voids, Proceedings of SPIE:Detection & Remediat Tech. for Mines & Minelike Targets VI vol. 4394 pps. 55–64, 4/01 Nelson et al.

Super Sensitive, Real Time and Wide Coverage, All Terrain Ground Robotic & Hand Help Systems for Mine and UXO Detection & Mapping, Oct. 12–14, 1998, Conf. Proc. pp 208–212 Zafrir, etal.

PCT International Search Report, PCT/US02/37736, Dated Nov. 25, 2002.

* cited by examiner

COMPACT, AUTONOMOUS ROBOTIC DETECTION AND IDENTIFICATION SENSOR SYSTEM OF UNEXPLODED ORDNANCE SITE REMEDIATION

CROSS-REFERENCE TO RELATED APPLICATIONS

The application claims the benefit of prior filed co-pending U.S. provisional application No. 60/337,308, filed on Dec. 4, 2001.

BACKGROUND OF THE INVENTION

1. Field of the Invention

The present invention relates to a device for detecting metal targets in general and, more particularly, for detecting metal targets, such as unexploded ordnance (UXO), underground utilities, landmines buried in the soil or otherwise visually obscured.

2. Description of the Related Art

In a variety of situations, it may be desirable to determine whether metal objects exist that are obscured from view in some manner. The objects could include buried cables, such as power or communications cables. Other objects could include buried unexploded ordnance. The objects could be buried under ground or visually obscured in other manneis, such as by a portion of a structure.

Unexploded ordnance (UXO), and particularly land mines, represent a tremendous worldwide problem. Many people are killed and maimed through encounters with unexploded ordnance. Additionally, areas where UXOs are present may not be utilized for other activities, such as agriculture and housing, among others. As a result, UXO causes human pain and suffering, displaces people and results in great expenditures for health care and loss of arable land.

Addressing the UXO problem is a worldwide concern. The process of searching for and identifying UXO is a costly, dangerous, tedious and time consuming process. For example, the US Government has estimated that UXO clearance in the United States may cost as much as 300 billion dollars and could take as long as 100 years to resolve at the present funding level.

Currently, two primary search methods exist for UXO and land mine clearance. These include human-towed or hand-carried sensor systems and special vehicles designed to pull or push large and cumbersome sensor carts. These methods have several drawbacks. Among the drawbacks are the high cost for human operators and vehicle systems. Also, operator fatigue is an issue with both methods. For example, cold and hot weather can adversely affect human operators. Additionally, both methods expose operators to danger in hostile environments. For example, operators may be exposed to live munitions, animals, harsh terrain and bad weather. Furthermore, human operators may make mistakes in navigation. Use of the known methods is typically limited to daylight working hours, since as vision is diminished the dangerous work may become significantly more dangerous. Even after encountering all of these hazards, the known methods do not provide any real time information to ensure that the test area was properly surveyed or that the sensor was operated correctly.

While some proposals have been made to automate the process of UXO detection, for example the system described in U.S. Pat. No. 6,026,135 to McFee, these proposals have been large, cumbersome and costly vehicle systems including towed sensor carts. It would be desirable to have a system for automating the process of detection of UXO.

SUMMARY OF THE INVENTION

The present invention provides a device operative to detect metal objects. The device includes a transmitter, an upper transmitter coil and a lower transmitter coil operatively connected to the transmitter. A current fed through the upper transmitter coil and the lower transmitter coil generates a field that excites eddy currents in metal objects in the vicinity of the upper transmitter coil and the lower transmitter coil. An upper magnetic field detector and a lower magnetic field detector are operative to sense eddy currents generated in the metal objects. Processor elements operatively connected to the upper magnetic field detector and the lower magnetic field detector collect, store and analyze the eddy currents and thereby automatically determine the likelihood that a metal object has been detected. A navigation system operatively connected to the processor elements controls movement of the device. Transporting elements operatively connected to the navigation system support the device and permit alteration of a position of the device.

BRIEF DESCRIPTION OF THE DRAWINGS

Objects and advantages of the present invention will be more clearly understood from the following specification when considered in conjunction with the accompanying drawings, in which.

DESCRIPTION OF THE PREFERRED EMBODIMENT(S)

Figure 1:
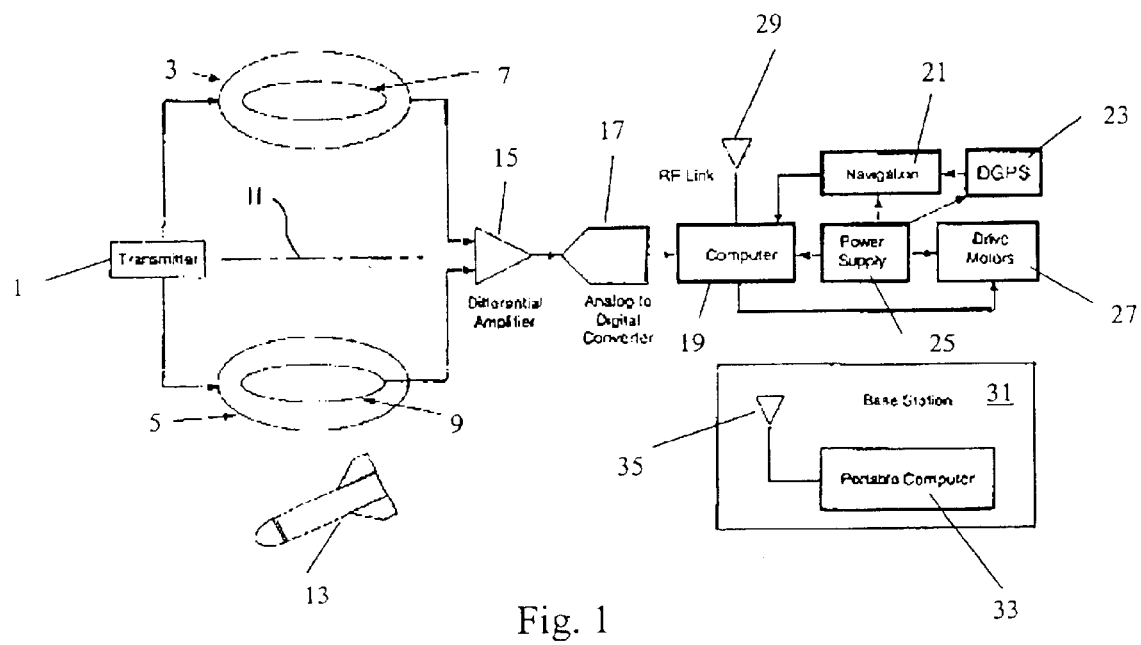
FIG. 1 represents a block diagram that illustrates elements of an embodiment of a device according to the present invention.

The present invention provides a device that can operate autonomously on land or in the water. Automation provides a key component that permits more cost effective and safer UXO and land mine site remediation. The compact, autonomous robotic detection and identification system according to the present invention provides significant advantages as compared to known systems and methods.

The present invention provides a compact, rugged, and easy to transport and deploy lightweight robotic sensor platform. The unique electromagnetic induction sensor configuration of the present invention provides a compact, self-powered autonomous sensor system design. The present invention utilizes electromagnetic induction (EMI) sensor technology to detect buried metal targets such as UXO. Both time and frequency domain EMI sensor technology could be utilized. For simplicity of discussion, a time domain or pulsedtransmitter version of the device will be described. One skilled in the art could construct a similar device using frequency domain techniques without undue experimentation once aware of the disclosure contained herein. In addition to detection, the EMI signature from the metal object can be used for metal target classification.

Among the advantages of the present invention are that it can operate at all times in all conditions. In other words, the present invention can operate day and night in all weather conditions. Land or underwater operation, for example operation along the water's bottom, is also a feature of the present invention. Additionally, for land operations, the present invention can realize cost savings through use of inexpensive commercially available wireless local area networks (WLAN) for data transmission. In fact, multiple devices according to the present invention may operate simultaneously via a WLAN in one UXO clearance area. Other off the shelf components may also be employed to help reduce the cost of the system. Another advantage of the present invention is that it can provide real time site mapping utilizing a global positioning system and/or an inertial navigation referenced coordinate system. Furthermore, the present invention can be operated manually, semi-autonomously, or completely autonomously. Automation can greatly reduce the costs associated with UXO site remediation.

A device according to the present invention includes at least one pair of transmitter coils. A pair of transmitter coils are arranged as an upper transmitter coil above a lower transmitter coil. The upper transmitter coil is typically arranged directly above the lower transmitter coil and the two transmitter coils typically are fixed relative to each other.

The upper and lower transmitter coils are each operatively connected to a transmitter circuit. The transmitter circuit can send current into both the upper and lower transmitter loops. The current may be pulsed or continuous. A continuous frequency current may be single or multiple frequency. Any current characteristics may actually be employed.

The pulse current can excite eddy currents in metal objects in the vicinity of the transmitter loops. After the pulse of current stops flowing through the transmitter coils, no energy exists to sustain the eddy currents. As a result, the eddy currents will decrease. The decrease occurs with a characteristic time that depends upon the size and shape of the metal object as well as on the electrical and magnetic properties of the metal object.

While any size antenna may be utilized, a typical antenna is about one meter; square. An antenna may have other shapes, such as circular. Also, the antenna could have dimensions of about 0.5 m to about 2 m.

Typically, the metal objects are located near the ground surface directly under the transmitter loops up to about 3 m from the transmitter loops. Of course, the size, shape, orientation, distance, and other factors related to the metal objects can affect detection of the metal objects. Similarly, the characteristics of the transmitter coils, such as their size and power, can also affect detection of the metal objects.

To detect the eddy currents, the present invention includes a pair of magnetic field sensing devices or detectors. Any magnetic field detector may by utilized that has the necessary bandwidth compatible with the target detection requirements. For example, fluxgate magnetometer and giant magneto-resistors could be employed. According to one example, the present invention includes a pair of inductive loop receiver coils. The receiver coils may be arranged co-axially with the transmitter coils. The detectors typically are fixed in position relative to each other and relative to the transmitter coils. The transmitter coils and the detectors may be symmetrical and arranged symmetrically with respect to a line of symmetry. As with the transmitter coils, the characteristics of the receiver coils can affect detection of the metal objects. All major non-metallic components may be symmetrically placed along the magnetic symmetry axis of the metal detecting sensor so that the device's self-metal signature is minimized or cancelled.

The detected eddy currents are analyzed to determine the nature of metal objects that produced the eddy currents. Each receiver produces an output that may be expressed as follows:

Lower Receiver Coil=$TX+UXO(r1)$+System+Noise

Upper Receiver Coil=$TX+UXO(r2)$+System+Noise wherein TX represents residue currents in the transmitter coil; UXO(r) represents the UXO target at distance r, wherein r1 and r2 represent distances from the UXO to the lower and upper receiver coils, respectively; System represents the metal in the sensor system electronics of the device of the invention, such as a processor, battery, and motor drive system; and Noise represents far-field noise sources such as power line emissions.

The present invention may include a number of processing elements operative to analyze the signals resulting from the eddy currents. The processing elements can include a processor, such as a computer. Other elements that may be included to facilitate the processing of the signals include an amplifier and an analog to digital converter. The processing elements may include memory elements. The memory elements may store the results of searches for metal objects, such as UXO. Also, memory elements may store eddy current signatures of known UXO for comparison to results produced by the device. Other processing elements may be included as needed. The present invention can include low-cost, commercial single board computer system technology.

A differential amplifier may be included to receive output signals from the magnetic field detectors. The transmitter, system electronics, and noise sources are approximately nulled in the two receiver coils because of the symmetric physical layout of the system. The output of the amplifier may be expressed as follows:

Amplifier Output=$UXO(r1)-UXO(r2)$

To a first order in a far field, a simple dipole model may be employed for the UXO response. The UXO response typically falls off with distance r at about $1/r^3$. If a separation distance between the upper and lower transmitter/receiver pairs is relatively large (r1>r2), UXO(r2) is small compared to UXO(r1) and the amplifier output is approximately UXO (r1).

After detecting a metal object, the present invention can be utilized to classify the object. The time decay signature and spatial response over a target may be utilized to classify targets. Experience, such as gained by testing actual objects, may be utilized to derive time decay signatures and spatial responses and thus makes it possible to classify objects. Those of ordinary skill in the art would know how to derive time decay signatures and spatial responses without undue experimentation.

A device according to the present invention also includes transporting elements. The nature of the transporting elements may vary depending upon the environment in which the device is utilized. For example, for deployment on land, a device may include a plurality of wheels or crawler tracks. On the other hand, in an embodiment for use in water or other liquid, the transporting elements could include one or more propellers or other elements for moving the device through the liquid. The propeller may be attached to the device with a gimbaled mount to permit the propeller to help control movement of the device. An embodiment for use underwater may include transporting elements, such as one or more propellers, jets, and/or other elements, operative to move the device through water, as well as wheels, crawler tracks or other elements for moving along the sea floor, lake bed, or other surface under the water.

An embodiment for use in water or another liquid may include elements for controlling the transporting the device through the water. Along these lines, the device may include moveable control surfaces and stabilizing surfaces for controlling movement of the device in various planes.

Typically, transporting elements for use on land or on an underwater surface have a contact patch with the ground that sufficiently distributes the weight of the device to avoid detonating any UXO. For example, the wheels could include very wide large diameter tires and/or crawler tracks. In many cases, the transporting elements need to be capable of traversing rough terrain. The suspension system of the device may also help to prevent such unintended detonation, such as by being very soft.

Also, the transporting elements typically are non-metallic to avoid affecting the readings of the device. This is true of other elements of the present invention as well. For example, a frame that elements of a device according to the invention are mounted on may be made of plastic and/or other non-metallic materials. If elements of a device according to the present invention may not be made of non-metallic materials, it is desirable to arrange metallic elements in a symmetric fashion and a distance from the transmitter/receiver coils so as not to saturate the sensor electronics.

Each transporting element may be driven by a separate motor. Alternatively, one motor may drive more than one transporting element. The motor(s) could be, for example, electric, hydrolytic, flywheel, and/or fossil fuel driven.

The transporting elements may generate electrical interference that is not cancelled out by the differential receiver coil arrangement. This interference may affect the EMI sensor's ability to detect a metal object. For this case, the data collection and transporting mechanism may be time multiplexed so as not to interfere with metal detection. Additionally, a frequency domain version of the device could use narrow frequency band filtering to minimize this problem.

To facilitate the automatic operation of a device according to the present invention, the device may include a navigation system. The navigation system may be operatively connected to the transporting elements as well as to processing elements. Based upon the targets identified, the path of the device may be altered.

The path of the device may also be altered by rough terrain and/or obstacles. To address these issues, the navigation system may include an obstacle avoidance system. Several such systems are known. For example, obstacle avoidance systems have been developed and implemented on spacecraft, such as the Mars pathfinder.

To facilitate operation and particularly automatic operation of a device according to the present invention, the navigation system may include a global positioning system (GPS) system. The GPS system may be a differential GPS (DGPS) system, which corrects GPS signals to within an average of three to five meters. The most common DGPS correction service consists of a network of towers that receive GPS signals and transmit a corrected signal by beacon transmitters. In order to get the corrected signal, users must have a differential beacon receiver and beacon antenna in addition to their GPS. The GPS system can also help to map locations of targets.

The navigation system may also include an inertial navigation system. Typically, the navigation system includes the DGPS, obstacle avoidance system (OAS) and inertial navigation systems (INS) the combination of all three systems will help to facilitate continuous operation of the system. Along these lines, the INS and OAS may be utilized in forested areas, for example, where the tree canopy hinders DGPS operation.

Connections among the processing elements, navigation system components and/or the transporting elements could be wired or wireless.

A device according to the present invention may include an on-board power supply. Any suitable power supply may be employed. Examples of power supplies that may be employed include batteries and a sub-miniature diesel engine. Batteries could be rechargeable.

The present invention may also include a base station. The functions of a base station could include guidance as well as reception, storage, and analysis of positional data and results. Furthermore, the base station may plot in real time a map of results obtained by the mobile portion of the device. The base station may also run automatic target recognition (ATR) algorithms. Additionally, the base station can permit remote operation of the mobile elements of the device. Along these lines, base station software may be modular and one or more ATR algorithms using time decay target signatures can be implemented. The base station may also carry out other functions.

Elements of the present invention typically are mounted on at least one frame. As with other elements of the device, the frame(s) typically are non-metallic. Any non-metallic material, such as plastics, composite materials or others could be used.

The frame may actually include more than one frame or subframe. For example, one space frame may support the antenna, propulsion system and electronics. A second space frame may include a transport carriage space frame that can include a wheel or track system. With the metal detection antenna, propulsion system and electronics held rigidly with respect to each other, the metal signature measured by the metal detection antenna from the propulsion system and electronics can be minimized or cancelled thus allowing the metal detection antenna to only sense buried metal objects. The antenna, propulsion system and electronics space frame may be attached to a transport carriage space frame. The antenna, propulsion system and electronics space frame may be attached to the transport carriage space frame with the suspension system. The device may include another suspension system connecting the transporting carriage and the transporting members. Either suspension system may include axles, shock absorbers, and/or other elements. The suspension system(s) and/or the transporting members may be particularly designed to traverse certain terrain, such as sandy areas, rocky areas, open fields, forests, among others.

Elements of the suspension system as well as other elements of the device, such as the transmitter and receiver coils and processing elements may be interconnected with the frame so as to minimize interference with the operation of the device. This may include permitting certain elements to move relative to the frame and certain elements to be fixed relative to the frame. Along these lines, the upper and lower antennas, each including a transmitter and receiver, may be fixed relative to the frame. This may be desirable to nullify action of the differential antenna design.

The base station may wirelessly communicate with the mobile elements of the device. The wireless connection could include a wireless local area network (WLAN) to telemeter data from the mobile elements of the device to the base station. The WLAN may also permit an operator to control one or more mobile units. Along these lines, WLAN is a mature, robust, multi-user system that can permit multiple mobile systems to be operating simultaneously without the need to develop software or hardware.

Wireless connections may also be incorporated elsewhere in the device. Along these lines, the processor, navigation system and/or transporting elements may also be connected with wireless connections.

A device according to the present invention typically is modular. As a result, as developments in processing, sensing, networking or other aspect of the invention come along, the developments may be incorporated into the device with minimal changes.

FIG. 1 illustrates a simplified block diagram of an embodiment of a device according to the present invention. The embodiment shown in FIG. 1 includes a transmitter 1 connected to upper transmitting coil 3 and lower transmitting coil 5. This embodiment includes magnetic field detectors that include receiving coils. An upper receiving coil 7 and a lower receiving coil 9 are arranged within the upper and lower transmitting coils. The transmitting and receiving coils are symmetrically arranged about a symmetry line 11 and arranged above a UXO 13.

The receiver coils in the embodiment shown in FIG. 1 are connected to a differential amplifier 15, which is connected to an analog to digital (A/D) converter 17. The A/D converter is connected to a computer 19. The computer is connected to the navigation system 21, which includes a DGPS system 23. A power supply 25 is connected to the computer, navigation system DGPS system and drive motors 27 for driving transporting elements. This embodiment includes a wireless RF link 29 for communicating with a base station 31. Base station 31 includes a portable computer 33 and an RF link 35 for communicating with the mobile portion of the device.

Figure 2:
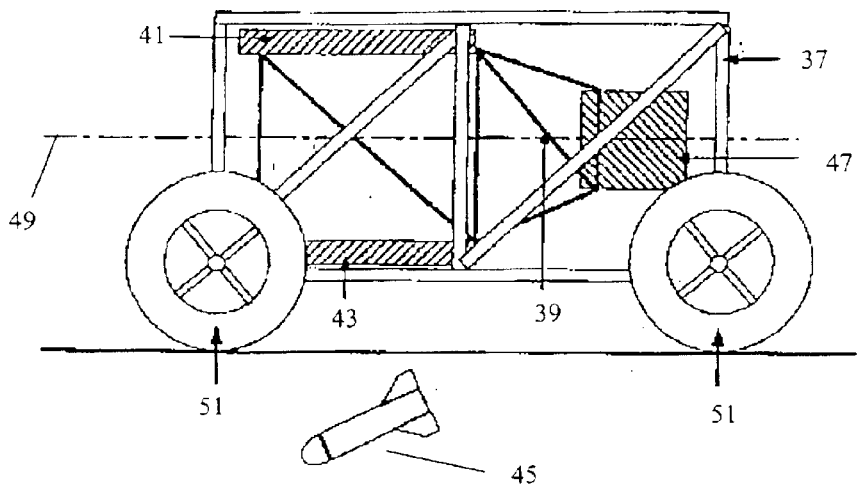
FIG. 2 represents a simplified diagram of an embodiment of a device according to the present invention.

FIG. 2 represents a simplified illustration of an embodiment of a device according to the present invention. The embodiment shown in FIG. 2 includes a dual vehicle space frame. The frame includes a transport carriage space frame 37 and a sensor/electronic space frame 39.

The upper 41 and lower 43 transmitter and receiver are connected to the sensor/electronic space frame. The upper and lower transmitter and receiver are arranged coaxially. In FIG. 2, the upper and lower transmitter and receiver are arranged above an UXO 45. The system electronics, power supply, and drive system 47 are also attached to the sensor/electronic space frame. In the embodiment shown in FIG. 2, the system electronics are centered on an antenna symmetry centerline 49. Components with a high metal content, such as a drive motor, are located as far from the antennas as possible. Off-axis components that connect the motor drive system to the wheels will be made of non-metallic components. The embodiment shown in FIG. 2 includes four wheels 51. The wheels are shown in FIG. 2 with a reduced diameter for purposes of illustration. Typically, the wheels would be larger to facilitate operation on rough terrain and/or terrain covered with loose material, such as gravel and sand.

The size of any embodiment of the mobile portion of a device according to the present invention may depend upon the size of the antenna and/or transmitter. With an antenna about one meter square, the mobile portion of the device could be about 1.7 m long by about 1 m wide by about 1.3 m high. Typically, it is desirable to maintain the weight of the vehicle as low as possible. For example, with the power source, the vehicle weight could be less than about 40 kg. However, the present invention provides a scalable, modular device that can be made larger or smaller to implement different sensor applications in different environments.

The present invention provides a unique sensor configuration in a compact vehicle design that allows metal components in an electronic, battery and drive motor system to be in close proximity to a sensitive metal detector. Because of its compact size, the present invention sensor system is capable of surveying areas that a conventional vehicle towed sensor system cannot negotiate.

The present invention provides a sensor system that can utilize an active time or frequency domain EMI sensor to collect target signatures on a robotic platform and telemeter the data in real time to a base station. The computer located at a base station can collect, store, and analyze sensor data, and map in real time metal anomaly locations. Software that can be located at the base station can process metal target spatial and time signatures to identify metal anomalies.

As referred to above, the present invention may also be utilized underwater. A large fraction of UXO are located underwater. At present, it is beyond the state-of-the-art to detect these underwater buried UXO with high accuracy. Relatively simple magnetometers are towed from boats or ships. Problems of navigation, ship position versus sensor position, bottom tracking, height above the bottom, among other problems prevent the efficient use of these sensors.

Figure 3:
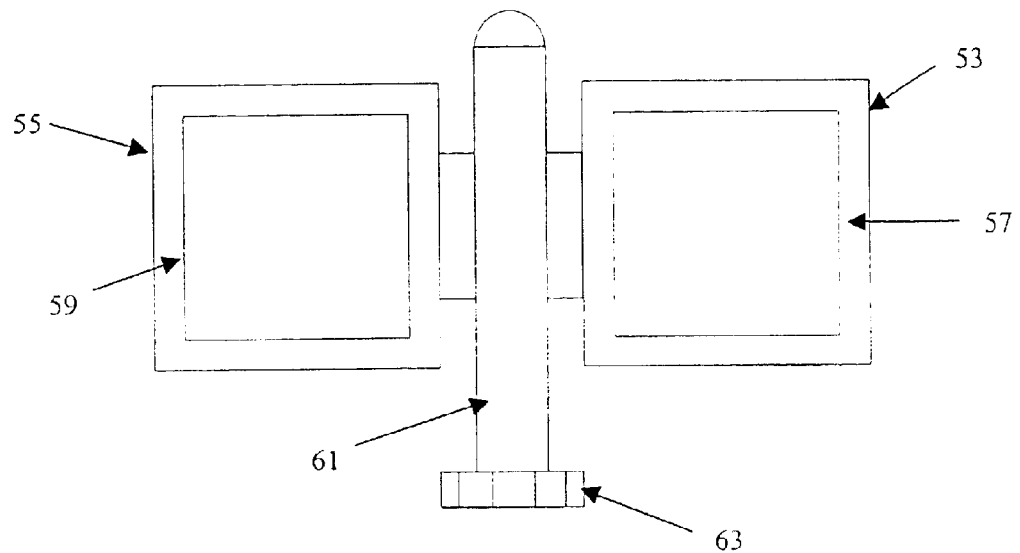
FIG. 3 represents an overhead view of another embodiment of a device according to the present invention.

The present invention also provides a compact, rugged, and easy to transport and deploy lightweight robotic sensor platform for underwater swimming applications that build on the same principles as described for the land version. Typically, a major difference in the robotic swimmer compared to the land version is that the transmitter and receiver coil arrangement may be changed from an over/under arrangement to a side-by-side arrangement as in the embodiment shown in FIG. 3. FIG. 3 shows a top view of an embodiment of a robotic swimmer. The embodiment shown in FIG. 3 includes two co-centric transmitters 53 and 55 and receiver pairs 57 and 59 forming the antenna. The swimmer could include wings to serve as stability and control surfaces for operation of the swimmer. The antenna could be incorporated into the wings of the swimmer. The propulsion system, power, computer and navigation may be housed within housing 61. Typically, the housing is designed to facilitate movement through the water. The embodiment shown in FIG. 3 includes a propeller 63 to propel the device through the water. The propulsion, power, computer and navigation system may be arranged along a magnetic symmetry axis of the planar arranged magnetic antenna. As with the land version, magnetic signatures from any metal components in the support structure, propulsion, power, computer or navigation system may be canceled by the differential signal processing from the antenna.

Figure 4:
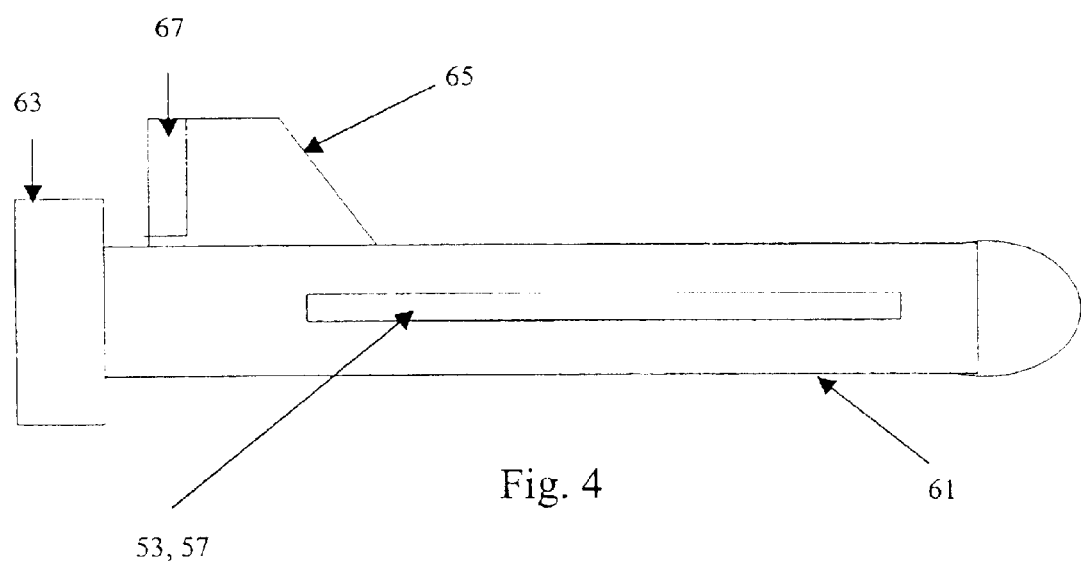
FIG. 4 represents a side view of the embodiment shown in FIG. 3.

FIG. 4 shows a simplified side view of the robotic swimmer. As shown in FIG. 4, the antennas are planar. Also shown in FIG. 4, the swimmer may include one or more stabilizing surfaces, such as vertical stabilizer 65. As stated above, the swimmer may include wings that the antenna are incorporated into. The wings may also serve as stabilizing surfaces. Typically, these surfaces are fixed. To control movement of the swimmer, the device may include one or more moveable control surfaces, such as control surface 67 that extends from the vetical stabilizer.

I claim:

1. A device operative to detect metal objects, the device comprising:
   a transmitter circuit;
   an upper transmitter coil and a lower transmitter coil symmetrically arranged about an antenna symmetry line and operatively connected to the transmitter circuit, wherein a current fed through the upper transmitter coil and the lower transmitter coil generates a field that excites eddy currents in metal objects in the vicinity of the upper transmitter coil and the lower transmitter coil;

an upper magnetic field detector and a lower magnetic field detector symmetrically arranged about the antenna symmetry line and operative to sense eddy currents generated in the metal objects;

processor elements operatively connected to the upper magnetic field detector and the lower magnetic field detector to collect, store and analyze the eddy currents and thereby determine the likelihood that a metal object has been detected, wherein at least some of the processor elements are arranged along the antenna symmetry line such that a metal signature of the device is cancelled or minimized;

a navigation system operatively connected to the processor elements to control movement of the device; and at least one transporting element operatively connected to the navigation system and operative to support the device and permit alteration of a position of the device.

2. The device according to claim 1, wherein the navigation system comprises an obstacle avoidance system.

3. The device according to claim 1, wherein the navigation system comprises an inertial navigation system.

4. The device according to claim 1, wherein the navigation system comprises a differential global positioning system receiver.

5. The device according to claim 1, wherein the navigation system is operatively connected to the processor elements.

6. The device according to claim 1, further comprising:

a wireless connection between the processor and the an upper magnetic field detector and a lower magnetic field detector.

7. The device according to claim 1, wherein the transporting elements comprise a plurality of wheels or tracks.

8. The device according to claim 1, wherein the transporting elements have a contact patch sufficiently large to prevent detonation of the unexploded ordnance.

9. The device according to claim 1, wherein the transporting elements are non-metallic.

10. The device according to claim 1, wherein metallic elements of the device are arranged a distance away from the upper transmitter coil and the lower transmitter coil sufficient to permit detection of unexploded ordnance.

11. The device according to claim 1, wherein a distance between the upper transmitter coil and the lower transmitter coil is substantially fixed.

12. The device according to claim 1, further comprising:

a power source operative to power the device.

13. The device according to claim 1, wherein the processor elements comprise an amplifier operatively connected to the upper magnetic field detector and the lower magnetic field detector to receive signals corresponding to the detected eddy currents, an analog to digital converter operatively connected to the amplifier to receive signals from the amplifier and convert the signals to a digital form and a processor operatively connected to the analog to digital converter to analyze the signals.

14. The device according to claim 1, wherein the current is pulsed.

15. The device according to claim 1, wherein the current is continuous frequency.

16. The device according to claim 1, wherein the current is single or multiple frequency.

17. The device according to claim 1, further comprising:

at least one control surface.

18. The device according to claim 17, wherein the at least one control surface is moveable.

19. The device according to claim 1, wherein the upper magnetic field detector and the lower magnetic field detector comprise receiver coils.

20. The device according to claim 19, wherein the upper and lower magnetic field deter coils are arranged within the upper and lower transmitter coils, respectively.

21. The device of claim according to claim 20, wherein the upper and lower magnetic with the upper and lower transmitter coils, respectively.

22. The device according to claim 1, further comprising:

a base station operatively connected to the device to control operation of the device.

23. The device according to claim 22, wherein the base station is operative to control operation of a plurality of devices simultaneously.

24. The device according to claim 22, wherein the base station is operative to receive and store positional and signature data regarding metal objects detected by the device.

25. The device according to claim 22, wherein the base station comprises automatic target recognition algorithms.

26. The device according to claim 22, further comprising:

a wireless connection between the device and the base station.

27. A device operative to detect metal objects, the device comprising:

a transmitter circuit:

an upper transmitter coil and a lower transmitter coil operatively connected to the transmitter circuit, wherein a current fed through the upper transmitter coil and the lower transmitter coil generates a field that excites eddy currents in metal objects in the vicinity of the upper transmitter coil and the lower transmitter coil;

an upper magnetic field detector and a lower magnetic field detector operative to sense eddy currents generated in the metal objects;

processor elements operatively connected to the upper magnetic field detector and the lower magnetic field detector to collect, store and analyze the eddy currents and thereby determine the likelihood that a metal object has been detected;

a navigation system operatively connected to the processor elements to control movement of the device; and at least one transporting element operatively connected to the navigation system and operative to support the device and permit alteration of a position of the device, wherein the transporting elements comprise a propeller.

28. The device according to claim 27, wherein the propeller is gimbaled.

* * * * *